(12) United States Patent
Pardee

(10) Patent No.: US 7,732,959 B2
(45) Date of Patent: *Jun. 8, 2010

(54) ROTATIONAL COUPLING DEVICE

(75) Inventor: James A. Pardee, Glen Ellyn, IL (US)

(73) Assignee: Warner Electric Technology, LLC, Braintree, MA (US)

( * ) Notice: Subject to any disclaimer, the term of this patent is extended or adjusted under 35 U.S.C. 154(b) by 801 days.

This patent is subject to a terminal disclaimer.

(21) Appl. No.: 11/150,027

(22) Filed: Jun. 10, 2005

(65) Prior Publication Data

US 2006/0279147 A1 Dec. 14, 2006

(51) Int. Cl.
*H02K 49/02* (2006.01)

(52) U.S. Cl. .......................................... 310/77; 310/93

(58) Field of Classification Search ............. 310/76–78, 310/92, 93
See application file for complete search history.

(56) References Cited

U.S. PATENT DOCUMENTS

| | | | |
|---|---|---|---|
| 2,481,028 A | 9/1949 | Lear | |
| 2,659,830 A | 11/1953 | Mason et al. | |
| 3,016,118 A | 1/1962 | Zatsky et al. | |
| 3,036,680 A * | 5/1962 | Jaeschke | 192/84.96 |
| 3,082,933 A | 3/1963 | Bernard | |
| 3,172,514 A * | 3/1965 | Hansen | 192/84.96 |
| 3,190,420 A | 6/1965 | Kampf | |
| 3,263,784 A | 8/1966 | Pierce | |
| 3,325,760 A | 6/1967 | Bernard | |
| 3,512,618 A | 5/1970 | Schafer | |
| 3,552,533 A | 1/1971 | Nitz | |
| 3,639,197 A | 2/1972 | Spain | |
| 3,677,377 A | 7/1972 | Miller | |
| 3,679,034 A | 7/1972 | Miller | |
| 3,712,428 A | 1/1973 | Marin | |
| 3,724,619 A | 4/1973 | Miller | |
| 3,789,966 A | 2/1974 | Miller | |
| 3,893,191 A | 7/1975 | Gold et al. | |
| 3,934,686 A | 1/1976 | Stimson et al. | |
| 3,945,476 A | 3/1976 | de Jong | |
| 3,994,379 A | 11/1976 | Miller et al. | |
| 4,030,583 A | 6/1977 | Miller | |
| 4,150,738 A | 4/1979 | Sayo et al. | |
| 4,210,890 A | 7/1980 | Olsen | |
| 4,387,794 A | 6/1983 | Schneider et al. | |
| 4,432,446 A | 2/1984 | Okano et al. | |

(Continued)

FOREIGN PATENT DOCUMENTS

DE 2110609 10/1972

(Continued)

OTHER PUBLICATIONS

English Language Abstract for DE 3212305, dated Oct. 13, 1983.

(Continued)

*Primary Examiner*—Dang D Le
(74) *Attorney, Agent, or Firm*—Dykema Gossett PLLC

(57) ABSTRACT

A rotational coupling device for use as a clutch and/or brake is provided having improved magnetic efficiency and structural integrity. A permanent magnet is coupled to one of a brake plate and an armature and axially aligned with a portion of the other for improved braking performance.

23 Claims, 5 Drawing Sheets

U.S. PATENT DOCUMENTS

| | | | |
|---|---|---|---|
| 4,496,922 | A | 1/1985 | Pardee |
| 4,498,066 | A | 2/1985 | Fujiwara et al. |
| 4,556,132 | A | 12/1985 | Lengsfeld et al. |
| 4,643,282 | A | 2/1987 | Edl |
| 4,709,794 | A | 12/1987 | Lengsfeld et al. |
| 5,023,499 | A * | 6/1991 | Kuwahara .................. 310/105 |
| 5,033,595 | A | 7/1991 | Pardee |
| 5,038,126 | A | 8/1991 | Becker et al. |
| 5,119,918 | A * | 6/1992 | Pardee ..................... 192/18 B |
| 5,250,921 | A | 10/1993 | Van Laningham et al. |
| 5,285,882 | A | 2/1994 | Pardee |
| 5,305,865 | A | 4/1994 | Larson et al. |
| 5,307,038 | A | 4/1994 | Ishimaru |
| 5,465,820 | A | 11/1995 | Dick |
| 5,549,186 | A | 8/1996 | Pardee |
| 5,609,232 | A | 3/1997 | Brownfield et al. |
| 5,909,073 | A * | 6/1999 | Lamb ......................... 310/78 |
| 5,971,121 | A | 10/1999 | Pardee |
| 6,206,159 | B1 | 3/2001 | Takuno et al. |
| 6,209,700 | B1 | 4/2001 | Wogaman et al. |
| 6,371,270 | B1 * | 4/2002 | Matsumoto ............ 192/84.961 |
| 6,827,189 | B2 | 12/2004 | Schneider et al. |
| 7,493,996 | B2 * | 2/2009 | Pardee ..................... 192/18 B |

FOREIGN PATENT DOCUMENTS

| | | |
|---|---|---|
| DE | 2 231 501 | 1/1974 |
| DE | 3212305 | 10/1983 |
| DE | 36 05 586 A1 | 8/1987 |
| DE | 36 27 787 A1 | 2/1988 |
| DE | 38 29 699 A1 | 3/1989 |
| EP | 0 537 022 A1 | 4/1993 |
| EP | 0 604 190 A1 | 6/1994 |
| EP | 0 953 784 A2 | 11/1999 |
| FR | 2 141 103 A | 1/1973 |
| FR | 2 405 586 A | 5/1979 |
| FR | 2405586 | 5/1979 |
| GB | 1586180 | 3/1981 |

OTHER PUBLICATIONS

International Search Report issued in PCT Patent Application No. PCT/US2006/019173 (claiming priority to U.S. Appl. No. 11/150,670) (Sep. 20, 2006).
Written Opinion issued in PCT Patent Application No. PCT/US2006/019173 (claiming priority to U.S. Appl. No. 11/150,670) (Sep. 20, 2006).
U.S. Appl. No. 11/150,670, inventor: James A. Pardee, filed Jun. 10, 2005.
U.S. Appl. No. 11/150,671, inventor: James A. Pardee, filed Jun. 10, 2005.
International Search Report issued in corresponding PCT application PCT/US2006/019138 (Sep. 28, 2006).
Written Opinion issued in corresponding PCT application PCT/US2006/019138 (Sep. 28, 2006).
International Search Report issued in PCT application PCT/US2006/019172 (claiming priority to U.S. Appl. No. 11/150,671) (Sep. 28, 2006).
Written Opinion issued in PCT application PCT/US2006/019172 (claiming priority to U.S. Appl. No. 11/150,671) (Sep. 28, 2006).
Office Action in U.S. Appl. No. 11/150,670 (Mar. 5, 2007.
Office Action in U.S. Appl. No. 11/150,670 (Jul. 10, 2007).
Office Action in U.S. Appl. No. 11/150,670 (Nov. 9, 2007).
Office Action in U.S. Appl. No. 11/150,671 (Jan. 9, 2007).
Office Action in U.S. Appl. No. 11/150,671 (Jun. 27, 2007).
English language translation of German Publication No. DE 3627787.
Examiner's Answer issued in U.S. Appl. No. 11/150,670 (Jun. 19, 2008).
Office Action issued in U.S. Appl. No. 11/150,671 (Dec. 5, 2007).

* cited by examiner

ROTATIONAL COUPLING DEVICE

BACKGROUND OF THE INVENTION

1. Field of the Invention

This invention relates to rotational coupling devices such as brakes and clutches and, in particular, to a rotational coupling device having improved magnetic efficiency and performance and improved structural characteristics.

2. Discussion of Related Art

Rotational coupling devices such as clutches and brakes are used to control transfer of torque between rotational bodies. One type of conventional device is illustrated in U.S. Pat. Nos. 5,119,918, 5,285,882 and 5,971,121, the entire disclosures of which are incorporated herein by reference. This device includes a rotor that is coupled to an input shaft for rotation with the input shaft about a rotational axis. A field shell is also disposed about the input shaft on one side of the rotor and is fixed against rotation. The field shell defines radially spaced, axially extending inner and outer poles between which an electrical conductor is disposed, facing the rotor. A brake plate is coupled to the field shell and axially spaced from the field shell. The brake plate is disposed on a side of the rotor opposite the conductor. An armature coupled to an output member is disposed on the same side of the rotor as the brake plate and is disposed axially between the rotor and the brake plate. The armature is coupled to an output member by a plurality of leaf springs. Energizing the conductor produces a magnetic circuit in the field shell, rotor and armature that draws the armature into engagement with the rotor and couples the input shaft and output member together for rotation. Upon deenergization of the conductor, the leaf springs draw the armature out of engagement with the rotor and into engagement with the brake plate to brake the armature and output member. Permanent magnets coupled to the brake plate are also used to create another magnetic circuit between the brake plate, the field shell and the armature to assist the leaf springs in braking the armature and output member.

The above described devices generally perform well. The magnetic circuits within the device, however, are not optimally efficient or isolated from each other. Further, the armature is difficult to disengage from the brake plate and the engagement surfaces of the device still suffer from an undesirable amount of wear. The mounting of the conductor within the field shell of the device is also not optimal and there is a desire to improve the strength of the mounting arrangement.

The inventors herein have recognized a need for a rotational coupling device that will minimize and/or eliminate one or more of the above-identified deficiencies.

SUMMARY OF THE INVENTION

The present invention provides a rotational coupling device.

A rotational coupling device in accordance with one aspect of the present invention includes a rotor coupled to an input shaft for rotation therewith. The input shaft is disposed about a rotational axis. The device further includes a field shell disposed about the input shaft and fixed against rotation and an electrical conductor disposed within the field shell on a first side of the rotor. The device further includes a brake plate coupled to the field shell and an armature disposed axially between the rotor and the brake plate on a second side of the rotor opposite the conductor. The armature is coupled to an output member. The device further includes a permanent magnet coupled to one of the brake plate and the armature and axially aligned with a first portion of the other of the brake plate and the armature.

A rotational coupling device in accordance with the present invention represents an improvement over conventional devices because the location of the magnet reduces the number of air gaps within the magnetic circuit formed by the brake plate, magnet, and armature thereby improving the efficiency of the magnetic circuit. The location of the magnet (and resulting magnetic circuit) also reduces flux travel between the brake plate and field shell thereby enabling easier release of the armature from the brake plate during clutch engagement.

These and other advantages of this invention will become apparent to one skilled in the art from the following detailed description and the accompanying drawings illustrating features of this invention by way of example.

DETAILED DESCRIPTION OF EMBODIMENTS OF THE INVENTION

Figure 1:
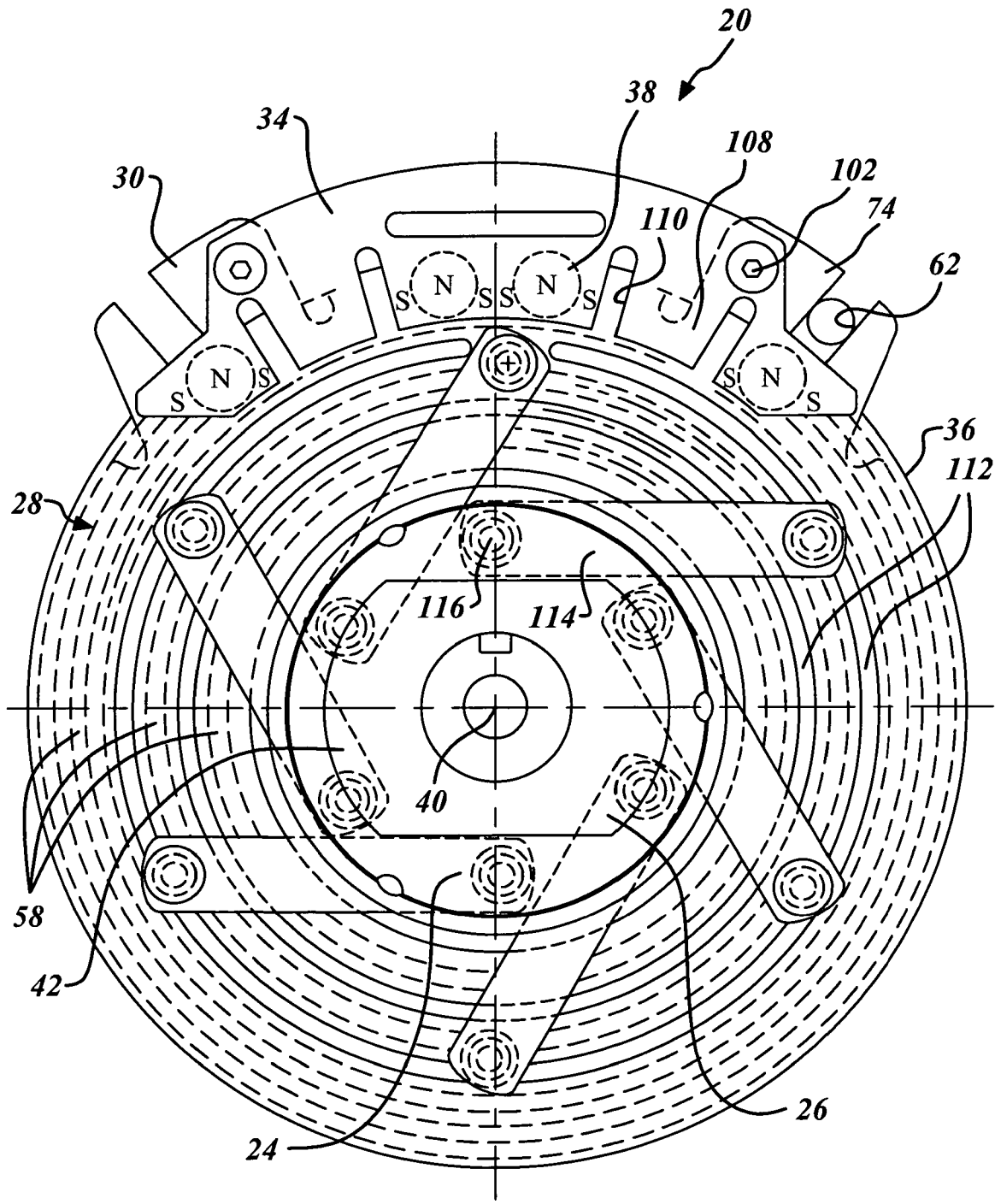
FIG. 1 is a plan view of a rotational coupling device in accordance with one embodiment of the present invention.
Figure 2:
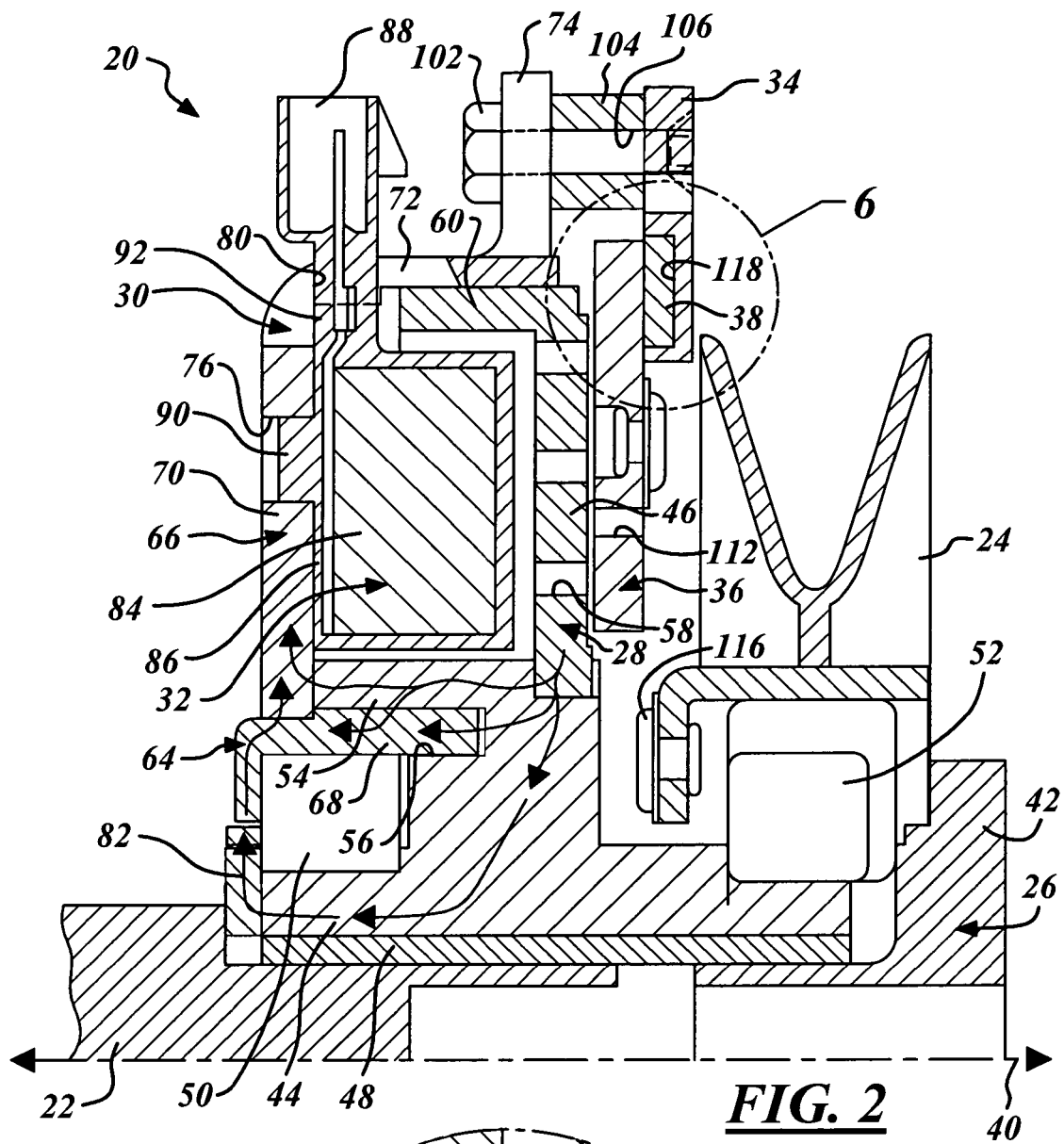
FIG. 2 is a cross-sectional view of the rotational coupling device of FIG. 1.

Referring now to the drawings wherein like reference numerals are used to identify identical components in the various views, FIGS. 1-2 illustrates a rotational coupling device 20 in accordance with one embodiment of the present invention. Device 20 functions as a clutch to selectively transfer torque from an input shaft 22 to an output member 24. Device 20 also functions as a brake on output member 24 when torque is not being transferred to output member 24. Device 20 may be provided for use in a riding lawnmower or similar device. It will be understood by those of ordinary skill in the art, however, that device 20 may be used in a wide variety of applications requiring a clutch or brake. Device 20 may include a spacer 26, a rotor 28, a field shell 30, an electrical conduction assembly 32, a brake plate 34, an armature 36 and one or more permanent magnets 38.

Input shaft 22 provides a source of torque for driving output member 24. Shaft 22 may be made from conventional metals and metal alloys and may be solid or tubular. Shaft 22 is centered about a rotational axis 40 and is driven by an engine, electric motor or other conventional power source. In the illustrated embodiment input shaft 22 is inserted into device 20 on a side of device 20 opposite output member 24. It should be understood, however, that the orientation of input shaft 22 and spacer 26 could be reversed such that input shaft 22 is inserted into device 20 on the same side as output member 24.

Output member 24 transfers torque to a driven device such as a lawnmower blade. Member 24 may comprise a conventional pulley around which a torque transmitting belt is wound and coupled to the driven device.

Spacer 26 is provided to support output member 24 in assembled relation with the other components of device 20 and may be made from conventional materials including powdered metals. Spacer 26 is disposed about axis 40 and is generally cylindrical in shape. Spacer 26 has a generally cylindrical outer surface that may include a keyway configured to receive a key of rotor 28. Spacer 26 also defines a flange 42 at one axial end.

Rotor 28 is provided for selective engagement with armature 36 to transmit torque between input shaft 22 and output member 24. Rotor 28 is disposed about axis 40 and is coupled to input shaft 22 for rotation therewith. Rotor 28 may be made from conventional metals and metal alloys and includes a hub 44 and a rotor disc 46.

Hub 44 is tubular and includes a radially inwardly extending key 48 configured to be received within the keyways of input shaft 22 and spacer 26. Proximate its radially inner diameter and at either axial end, hub 44 supports bearings 50, 52. At its radially outer diameter, hub 44 defines an axially extending inner rotor pole 54. Hub 44 further defines an axially extending recess 56 radially inwardly of pole 54 for a purpose described hereinbelow.

Disc 46 extends radially outwardly from hub 44. Disc 46 is coupled to hub 44 through, for example, a press-fit relationship including plurality of complementary lugs and notches. As is known in the art, disc 46 may include a plurality of radially spaced rows of angularly spaced, banana shaped slots 58. Upon energization of conduction assembly 32, slots 58 cause magnetic flux to travel back an forth between disc 46 and armature 36 across an air gap enabling a high torque engagement between rotor 28 and armature 36. In the illustrated embodiment, disc 46 includes three rows of slots 58. It should be understood, however, that the number of rows of slots 58, the number of slots 58 in any one row, and the size and shape of slots 58 may vary. At its outer diameter, disc 46 defines an axially extending outer rotor pole 60. Pole 60 is radially aligned with pole 54 and spaced radially outwardly of pole 54.

Field shell 30 is provided to house conduction assembly 32. Shell 30 also forms part of a magnetic circuit that causes the selective engagement of rotor 28 and armature 36. Field shell 30 may be made from conventional metals and metal alloys, including steel. Shell 30 is cylindrical and is disposed about axis 40. Shell 30 is fixed against rotation through, for example, a fastener (not shown) extending through a slot 62 in shell 30. Shell 30 is generally U-shaped in cross-section and includes radially inner and radially outer annular members 64, 66.

Inner member 64 is supported on an outer race of bearing 50. Member 64 is generally L-shaped in cross-section and defines an axially extending inner pole 68. Pole 68 extends into recess 56 of hub 44 of rotor 28 and is disposed radially inwardly of inner rotor pole 54 in accordance with one aspect of the present invention described in greater detail hereinbelow.

Figure 3:
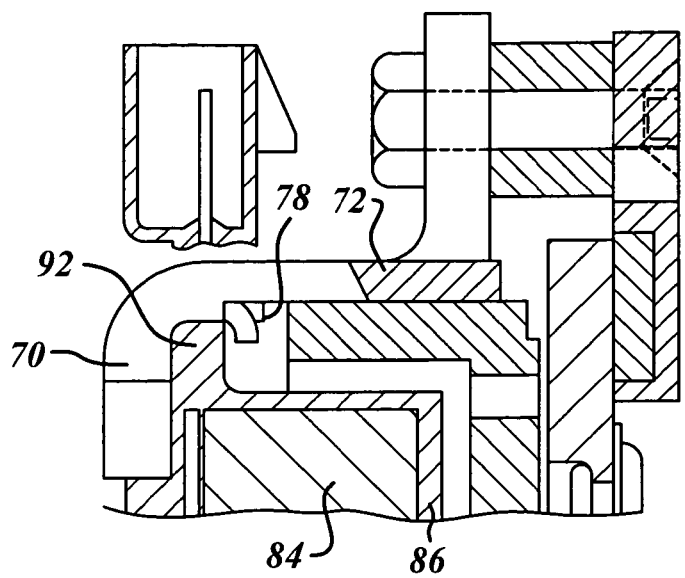
FIG. 3 is an enlarged cross-sectional view of a portion of the rotational coupling device of FIGS. 1-2 illustrating another aspect of the present invention.

Outer member 66 is coupled to and supported on inner member 64. Outer member 66 defines an end wall 70, an axially extending outer pole 72, and a flange 74. End wall 70 extends radially outwardly from member 64 and defines one or more recesses 76 for a purpose described hereinbelow. Pole 72 is integral with, and extends axially from, end wall 70. Pole 72 is disposed radially outwardly of pole 60 of rotor 28. Referring to FIG. 3, a radially inner surface of pole 72 may define a stepped inner diameter forming a shoulder 78 for a purpose described hereinbelow. An aperture 80 is also formed through pole 72 through which leads for conduction assembly 32 extend outward. Flange 74 is integral with, and extends radially outwardly from, pole 72 at an end of pole 72 opposite end wall 70. Referring to FIG. 1, flange 74 extends along at least a portion of the circumference of pole 72.

Conduction assembly 32 is provided to create a magnetic circuit among rotor 28, a spacer 82 (or spacer 26 if the orientation of input shaft 22 is reversed), field shell 30, and armature 36 to cause movement of armature 36 into engagement with rotor 28 and transmission of torque from input shaft 22 to output member 24. Conduction assembly 32 is generally annular and is disposed about axis 40 within field shell 30. In particular, assembly 32 is disposed between the inner and outer poles 68, 72 of shell 30. Assembly 32 includes a conductor 84 and a shell 86.

Conductor 84 may comprise a conventional copper coil although other known conductors may alternatively be used. Conductor 84 may be connected electrically to a power supply (not shown) such as a battery. Upon energization of conductor 84, a magnetic circuit is formed between rotor 28, a spacer 82 (or spacer 26 if the orientation of input shaft 22 is reversed), field shell 30, and armature 36. Magnetic flux flows from pole 72 of shell 30 across an air gap to pole 60 of rotor 28. Flux then travels back and forth between disc 46 and armature 36 across the air gap between them. Flux then flows from disc 46 to hub 44 of rotor 28 and back to members 64, 66 of field shell 30.

In accordance with one aspect of the present invention, the location of inner rotor pole 54 radially outwardly of inner field shell pole 68 improves the magnetic efficiency of this magnetic circuit. Because field shell 30 is typically made from multiple members 64, 66, an air gap exists between members 64, 66. By locating inner pole 54 of rotor 28 radially outwardly of inner pole 68 of field shell 30, at least some of the magnetic flux travels directly from pole 54 of rotor 28 to member 66 of field shell 30 as shown in FIG. 2—bypassing the air gap between members 64, 66 of field shell 30. The relative location of the inner rotor and field shell poles 54, 68 is also advantageous because the gap between field shell poles 68, 72 is enlarged, enabling easier insertion and fastening of conduction assembly 32 within field shell 30.

In traveling between rotor 28 and field shell 30, magnetic flux travels radially outwardly of bearing 50 along a path from rotor hub 44 to members 64, 66 of field shell 30. Magnetic flux also travels radially inwardly of bearing 50 along another path from rotor hub 44 to member 64 of field shell 30. In this latter path, flux passes from hub 44 to spacer 82 (or spacer 26 if the orientation of input shaft 22 is reversed) before returning to member 64 of field shell 30. This alternate flux path allows a portion of the flux to avoid the high density area of inner rotor pole and field shell poles 54, 68 thereby improving the magnetic efficiency of the circuit.

Shell 86 is provided to house conductor 84 and is also used to mount conductor 84 within field shell 30. Shell 86 may be molded from conventional plastics. Shell 86 may include an integral terminal connector 88 through which conductor 84 may be electrically connected to a power source. Connector 88 may extend through aperture 80 in field shell 30. Shell 86 may also define one or more lugs 90 sized to be received within recesses 76 in end wall 70 to prevent rotation of conduction assembly 32.

Referring to FIG. 3, in accordance with another aspect of the present invention, shell 86 may include a radially outwardly extending flange 92. Flange 92 is disposed proximate outer pole 72 of field shell 30. Flange 92 is affixed to field shell 30 at a plurality of points. Because conduction assembly 32 is affixed to field shell 30 proximate the outer diameter of shell 30 rather than the inner diameter as in conventional devices, conduction assembly 32 can be secured in more locations and at a larger radius from the center of rotation 40 of device 20 as compared to conventional devices. As a result, the structural integrity of device 20 is greater than conventional devices. Further, the connection of conduction assembly 32 proximate the outer diameter of shell 30 enables the novel arrangement of the inner rotor and field shell poles 54, 68 for improved magnetic performance.

Figure 6:
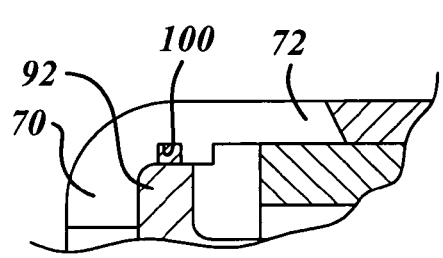
FIG. 6 is an enlarged cross-sectional view of a portion of a rotational coupling device in accordance with another embodiment of the present invention.
Figure 4:
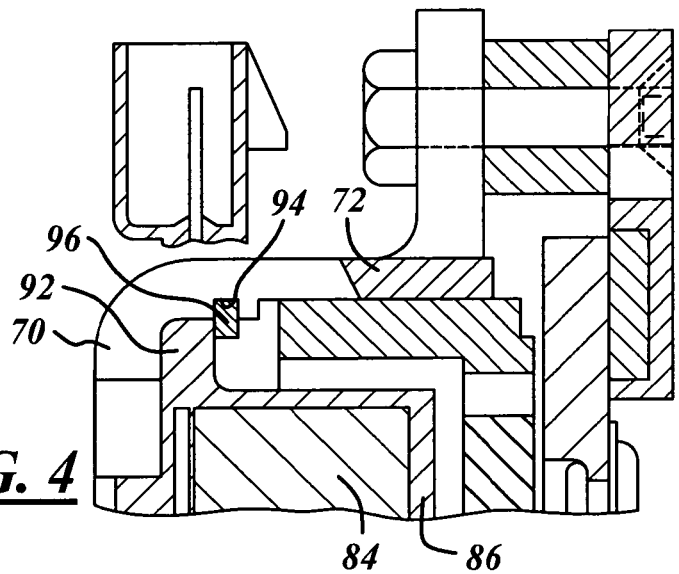
FIG. 4 is an enlarged cross-sectional view of a portion of a rotational coupling device in accordance with another embodiment of the present invention.
Figure 5:
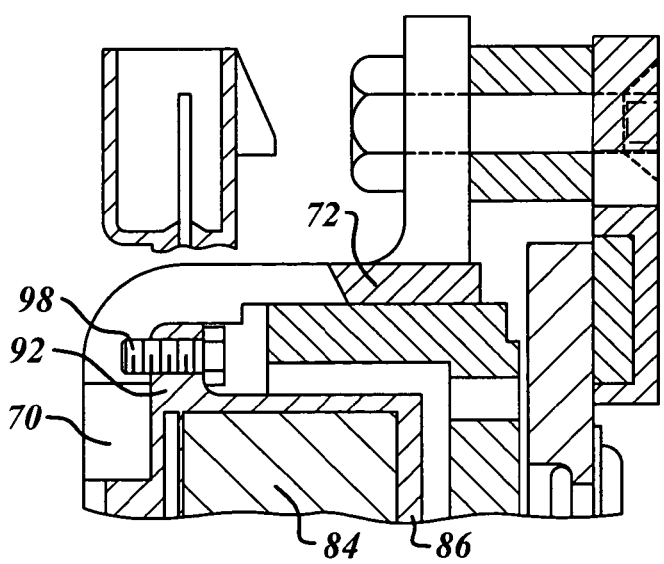
FIG. 5 is an enlarged cross-sectional view of a portion of a rotational coupling device in accordance with another embodiment of the present invention.

Flange 92 may be affixed to field shell 30 in a variety of ways. As shown in FIG. 3, a radially inner surface of pole 72 of field shell 30 (in particular shoulder 78) may be deformed at a plurality of points against flange 92 using a conventional tool to stake flange 92 within field shell 30. Referring to FIG. 4, in an alternative embodiment of the invention, the radially inner surface of pole 72 may define a groove 94 configured to receive a snap ring 96 that abuts and bears against flange 92 to retain conduction assembly 32 in field shell 30. Referring to FIG. 5, in another embodiment of the invention, fasteners 98 may extend through flange 92 into end wall 70 of field shell 30 at a plurality of points to retain conduction assembly 32 within field shell 30. Referring to FIG. 6, in yet another embodiment of the invention, flange 92 may be deformed by applying heat to portions of flange 92 to cause the heated portions flange 92 to flow and extend into grooves 100 formed in pole 72 and thereby stake flange 92 to shell 30. The flange 92 may also be affixed to the field shell 30 using an adhesive on the surface of the field shell 30 or within one or more grooves and may also be affixed by defining a plurality of tabs in the flange 92 and locating the tabs within corresponding slots in the field shell 30 upon a limited rotation of conduction assembly 32.

Referring again to FIGS. 1-2, brake plate 34 provides a braking surface for engagement by armature 36 to brake output member 24. Brake plate 34 may be made from conventional materials having a relatively low magnetic reluctance including conventional metals and metal alloys such as steel. Brake plate 34 extends about at least a portion of the circumference of device 20 and is coupled to field shell 30. In particular, brake plate 34 is coupled to flange 74 of field shell 30 using one or more fasteners 102. Fasteners 102 may be made from non-magnetic materials or materials having a relatively high magnetic reluctance to reduce or eliminate flux transfer between brake plate 34 and field shell 30 and thereby facilitate clutch engagement when conduction assembly 32 is energized. Brake plate 34 may be axially spaced from flange 74 of field shell 30 using one or more spacers 104. Spacers 104 may include bores 106 through which fasteners 102 extend. Spacers 104 may likewise be made from non-magnetic materials or materials having a relatively high magnetic reluctance to reduce or eliminate flux transfer between brake plate 36 and field shell 30. Referring to FIG. 1, brake plate 34 may include one or more radially extending, acruately spaced tabs 108 divided by radially extending, arcuately spaced slots 110 formed in brake plate 34 for a purpose described hereinbelow.

Armature 36 is provided to transmit a braking torque to output member 24 and to selectively transmit a drive torque from rotor 28 to output member 24. Armature 36 may be made form a variety of conventional metals and metal alloys including steel. Armature 36 is annular in construction and disposed about axis 40. Armature 36 is axially spaced from rotor 28 by an air gap. Like rotor disc 46, armature 36 includes a plurality of radially spaced rows of angularly spaced slots 112 that facilitate travel of magnetic flux back and forth between rotor 28 and armature 36 upon energization of conduction assembly 32. In the illustrated embodiment, armature 36 includes two rows of slots 112. The radially inner row of slots 112 on armature 36 is disposed between the radially inner and radially center row of slots 58 on rotor disc 46. The radially outer row of slots 112 on armature 36 is disposed between the radially center and radially outer rows of slots 58 on disc 46. It should be understood that the number of rows of slots 112 on armature 36, the number of slots 112 in any one row, and the size and shape of slots 112 may vary. Armature 36 is coupled to output member 24. In particular, armature 36 may be coupled to output member 24 by a plurality of leaf springs 114 Springs 114 transmit drive and braking torque from armature 36 to output member 24 and allow for axial movement of armature 36 relative to member 24 and towards and away from rotor disc 46. Springs 114 may be made from stainless steel and are connected at one end to armature 36 and at an opposite end to output member 24 using conventional fasteners 116 such as rivets, screws, bolts, or pins.

Magnets 38 are provided to create a magnetic circuit between brake plate 34 and armature 36 to draw armature 36 into engagement with brake plate 34 and provide a braking torque to output member 24. Magnets 38 may comprise neodymium iron boron (Nd—Fe—B) magnets or other known permanent magnets. Referring to FIG. 2, magnets 38 may be embedded within a closed bore 118 in brake plate 34 and may be arranged such that one face of the magnet 38 is flush with one side (and the engagement surface) of brake plate 34. By placing the magnets 38 such that one face is flush with the engagement surface of brake plate 34, magnets 38 add to the wear surface of brake plate 34 increasing its wear resistance and the braking surface. Referring to FIG. 1, magnets 38 may be arcuately spaced from one another about the circumferential extent of brake plate 34. A single magnet 38 may be disposed in each tab 108 wherein slots 110 serve to magnetically isolate each magnet 38 from other magnets 38. Alternatively, more than one magnet 38 may be disposed in a single tab 108 (and/or slots 110 eliminated) provided that the magnets 38 are appropriately spaced from one another. Magnets 38 may also be disposed in every other tab 108 to increase wear surface. It will further be appreciated that the number and location of magnets 38 within brake plate 34 may vary depending upon the characteristics of device 20 and related design requirements. As illustrated, magnets 38 are arranged such that the facing poles of adjacent magnets are of like polarity thereby forming parallel magnetic circuits. Alternatively, magnets 38 may be arranged such that the facing poles of adjacent magnets 38 are of opposite polarity thereby forming a less efficient series magnetic circuit.

Figure 7:
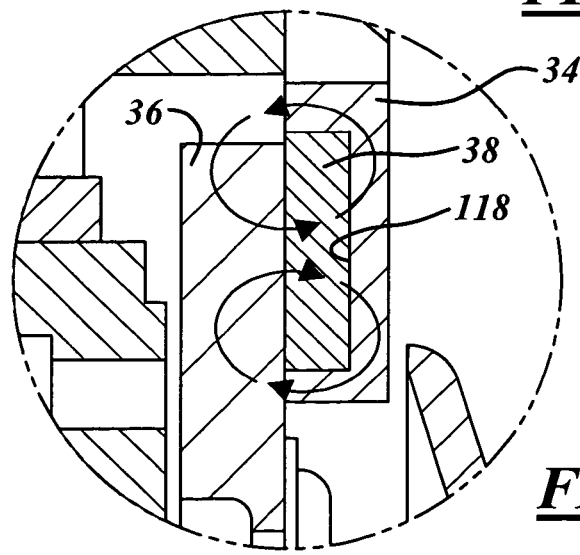
FIG. 7 is an enlarged view of a portion of FIG. 2.

Referring again to FIG. 2, in accordance with the present invention, magnets 38 are axially aligned with a portion of armature 36. Referring to FIG. 7, magnets 38 are oriented such that magnetic flux travels axially through said magnets 38. In particular, magnetic flux travels through one pole of each magnet 38 (located at the radial center of magnet 38) into brake plate 34. Flux continues to travel radially inwardly and outwardly along brake plate 34 towards an opposite pole of each magnet 38 (located at the radial periphery of magnet 38). Flux then travels to armature 36 and radially inwardly and outwardly and arcuately along armature 36 before crossing back into the radially center pole of magnet 38. The magnetic circuit formed by the inventive device 20 is more efficient than in conventional devices. In particular, the location of magnets 38 reduces the number of air gaps within the magnetic circuit formed by the brake plate 34, magnet 38, and armature 36 thereby improving the efficiency of the magnetic circuit. In particular, magnetic flux crosses only three air gaps: (i) from magnet 38 to brake plate 34; (ii) from brake plate 34 to armature 36; and (iii) from armature 36 to magnet 38. Further, because two of the air gaps involve the armature 36 and the braking surface formed by brake plate 34 or magnets 38, magnetic attraction is enhanced. The location of magnets 38 (i.e., remote from field shell 30) and resulting magnetic circuit also reduces flux travel between brake plate 34 and field shell 30 thereby enabling easier release of armature 36 from the brake plate 34 during clutch engagement.

Figure 8:
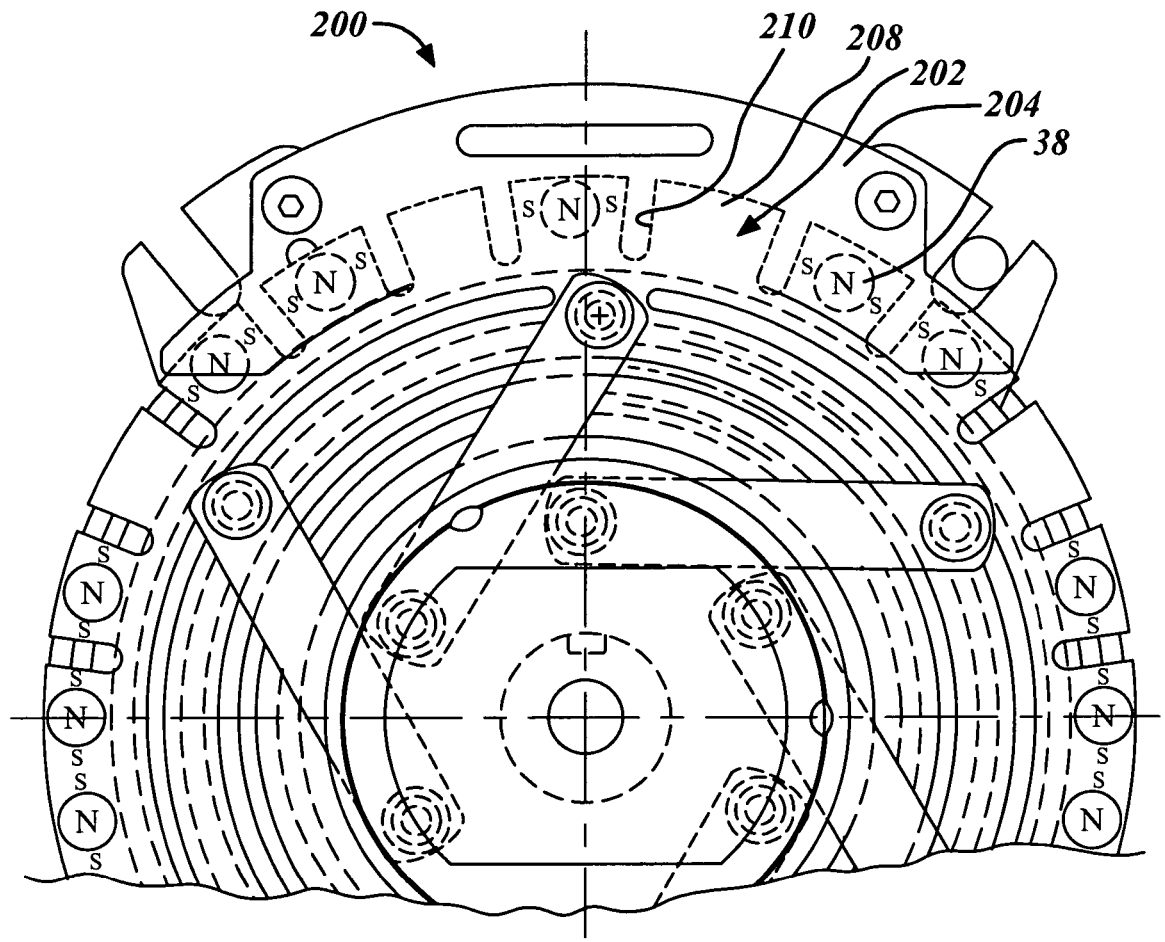
FIG. 8 is a plan view of a rotational coupling device in accordance with another embodiment of the present invention.
Figure 9:
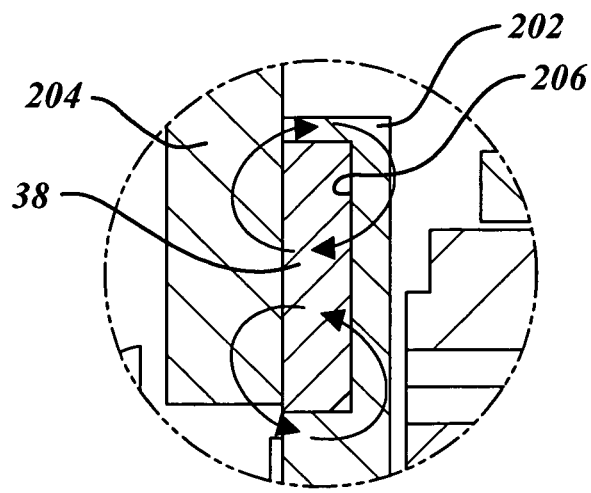
FIG. 9 is an enlarged cross-sectional view of a portion of the rotational coupling device of FIG. 7 taken along lines 8-8.

Referring now to FIGS. 8-9, a device 200 in accordance with another embodiment of the present invention is illustrated. Device 200 is substantially similar to device 20 and reference may be had to the description above for like components. Device 200 differs from device 20 in that magnets 38 are disposed within armature 202 rather than brake plate 204. Locating magnets 38 with armature 202 as opposed to brake plate 204 enables greater wear surface and wear resistance in brake plate 204 relative to brake plate 34 of device 20 (because of the absence of recessed magnets 38 and slots 110). Further, the magnetic flux within the magnetic brake circuit can be balanced with the flux generated upon energization of conduction assembly 32 to improve clutch engagement performance. On the other hand, more magnets 38 may be required and the magnets 38 are subjected to more extreme operating conditions. Referring to FIG. 9, magnets 38 may be embedded within closed bores 206 in armature 202 and may be arranged such that one face of the magnet 38 is flush with the side (and engagement surface) of armature 202. By placing the magnets 38 such that one face is flush with the engagement surface of armature 202, magnets 38 add to the wear surface of armature 202 increasing its wear resistance and the braking surface. Referring to FIG. 8, magnets 38 may be arcuately spaced from one another about the circumferential extent of armature 202. Armature 202 may include one or more radially extending, acruately spaced tabs 208 about its radially outer periphery divided by radially extending, arcuately spaced slots 210 formed in armature 202 for a purpose described hereinbelow. A single magnet 38 may be disposed in each tab 208 wherein slots 210 serve to magnetically isolate each magnet 38 from other magnets 38. Alternatively, more than one magnet 38 may be disposed in a single tab 208 (and/or slots 210 eliminated) provided that the magnets 38 are appropriately spaced from one another. Magnets 38 may also be disposed in every other tab 208 to increase wear surface. It will further be appreciated that the number and location of magnets 38 within armature 202 may vary depending upon the characteristics of device 200 and related design requirements. As illustrated, magnets 38 are again arranged such that the facing poles of adjacent magnets are of like polarity thereby forming parallel magnetic circuits. Alternatively, magnets 38 may be arranged such that the facing poles of adjacent magnets 38 are of opposite polarity thereby forming a less efficient series magnetic circuit.

Referring again to FIG. 9, in accordance with the present invention, magnets 38 are axially aligned with a portion of brake plate 204. Magnets 38 are again oriented such that magnetic flux travels axially through said magnets 38. In particular, magnetic flux travels through one pole of each magnet 38 (located at the radial center of magnet 38) into armature 202. Flux continues to travel radially inwardly and outwardly and arcuately along armature 202 towards an opposite pole of each magnet 38 (located at the radial periphery of magnet 38). Flux then travels to brake plate 204 and radially inwardly and outwardly and arcuately along brake plate 204 before crossing back into the radially center pole of magnet 38. The magnetic circuit formed by the inventive device 200 is again more efficient than in conventional devices because magnetic flux crosses only three air gaps: (i) from magnet 38 to armature 202; (ii) from armature 202 to brake plate 204; and (iii) from brake plate 204 to magnet 38. Further, because two of the air gaps involve the brake plate 204 and the braking surface formed by armature 202 or magnets 38, magnetic attraction is enhanced. The location of magnets 38 (i.e., remote from field shell 30) and resulting magnetic circuit also again reduces flux travel between brake plate 204 and field shell 30 thereby enabling easier release of armature 202 from the brake plate 204 during clutch engagement.

Figure 10:
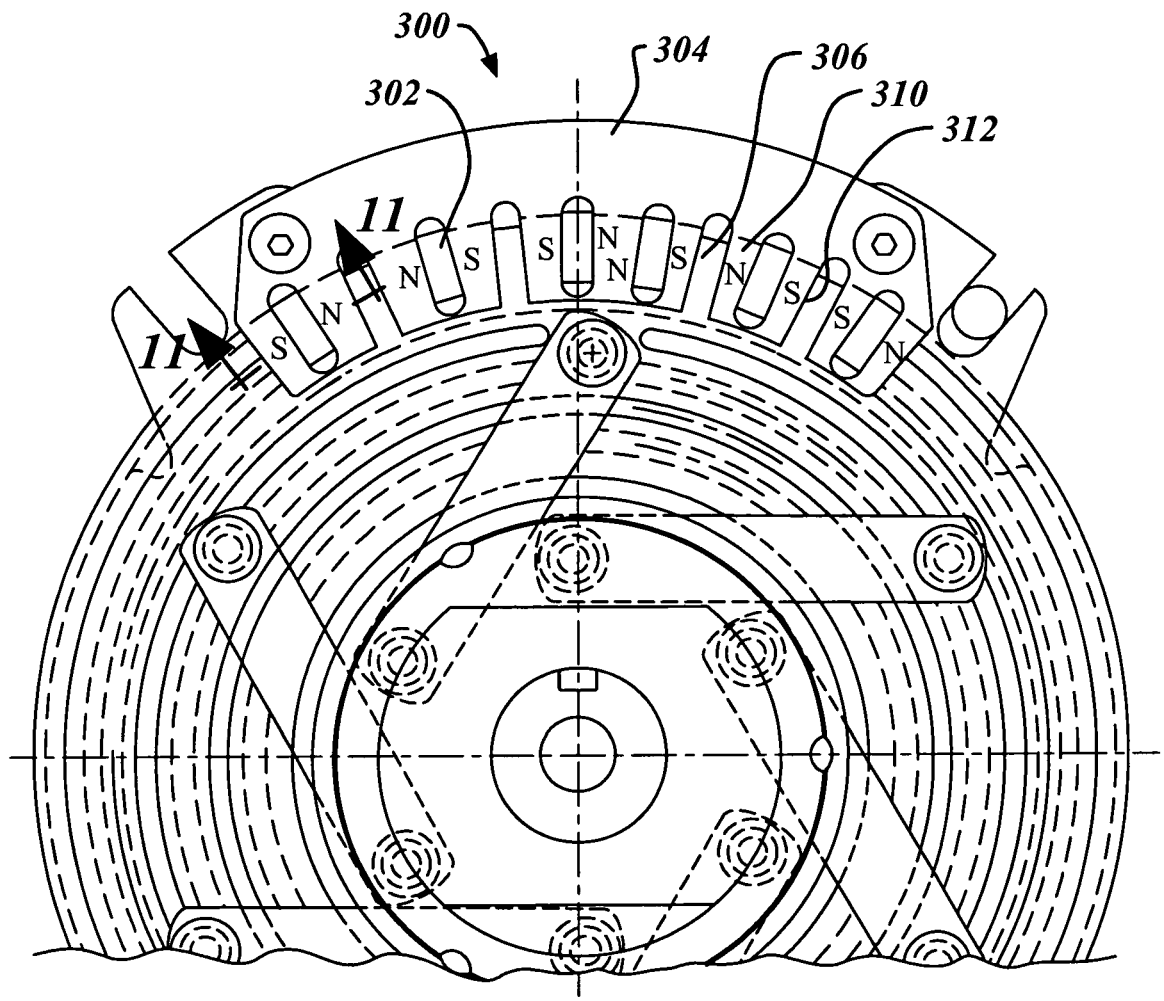
FIG. 10 is a plan view of a rotational coupling device in accordance with another embodiment of the present invention.
Figure 11:
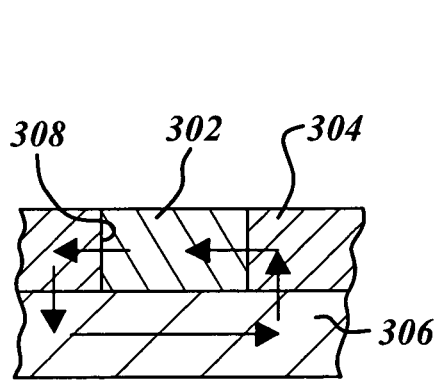
FIG. 11 is an enlarged cross-sectional view of a portion of the rotational coupling device of FIG. 9 taken along lines 10-10.

Referring now to FIG. 10-11, a device 300 in accordance with another embodiment of the present invention is illustrated. Device 300 is substantially similar to devices 20, 200 and reference may be had to the description above for like components. Device 300 differs from devices 20, 200 in that magnets 302 are oriented in a different manner within brake plate 304 or armature 306. In the illustrate embodiment magnets 302 are disposed within brake plate 304. It should be understood, however, that magnets 302 could alternatively be disposed within armature 306 as described hereinabove with reference to FIGS. 8-9. Referring to FIG. 10, magnets 302 are oriented with its opposite poles arcuately spaced from one another. Referring to FIG. 11, magnets 302 may be embedded within through bores 308 in brake plate 304 (or armature 306) and may be arranged such that one face of the magnet 302 is flush with one side (and the engagement surface) of brake plate 304 (or armature 306). By placing the magnets 302 such that one face is flush with the engagement surface of brake plate 304 (or armature 306), magnets 302 add to the wear surface of brake plate 304 (or armature 306) increasing its wear resistance and the braking surface. Referring again to FIG. 10, magnets 302 may be arcuately spaced from one another about the circumferential extent of brake plate 304 (or armature 306). Brake plate 304 may again include one or more radially extending, acruately spaced tabs 310 divided by radially extending, arcuately spaced slots 312. A single magnet 302 may again be disposed in each tab 310 of brake plate 304 (or armature 306) wherein slots 312 serve to magnetically isolate each magnet 302 from other magnets 302. Alternatively, more than one magnet 302 may again be disposed in a single tab 310 (and/or slots 312 eliminated) provided that the magnets 302 are appropriately spaced from one another. Magnets 302 may also be disposed in every other tab 310 to improve wear resistance. It will further be appreciated that the number and location of magnets 302 within brake plate 304 (or armature 306) may vary depending upon the characteristics of device 300 and related design requirements. As illustrated, magnets 302 are again arranged such that the facing poles of adjacent magnets are of like polarity thereby forming parallel magnetic circuits. Alternatively, magnets 302 may be arranged such that the facing poles of adjacent magnets 302 are of opposite polarity thereby forming a less efficient series magnetic circuit.

Referring to FIG. 11, in accordance with the present invention, magnets 302 are again axially aligned with a portion of armature 306 (or brake plate 304). Magnets 302 are oriented such that magnetic flux travels arcuately through magnets 302. In particular, magnetic flux travels from one pole of each magnet 302 (located at one arcuate end of magnet 302) into brake plate 304 (or armature 306). Flux then travels to armature 306 (or brake plate 304) across the air gap between brake plate 304 and armature 306. Flux continues arcuately across armature 306 (or brake plate 304) and returns to brake plate 304 (or armature 306) across the same air gap before returning to the opposite pole of magnet 302 (located at the other arcuate end of magnet 302) from brake plate 304 (or armature 306). The magnetic circuit formed by the inventive device 300 is again more efficient than in conventional devices (although less so than the magnetic circuit in devices 20, 200). In particular, the location of magnets 302 reduces the number of air gaps within the magnetic circuit formed by the brake plate 304, magnet 302, and armature 306 thereby improving the efficiency of the magnetic circuit. In particular, magnetic flux crosses only four air gaps: (i) from magnet 302 to brake plate 304 (or armature 306); (ii) from brake plate 304 to armature 306 (or from armature 306 to brake plate 304); (iii) from armature 306 to brake plate 304 (or from brake plate 304 to armature 306); and (iv) from brake plate 304 (or armature 306) back into magnet 302. Further, because two of the air gaps involve the armature 306 and the braking surface formed by brake plate 304, magnetic attraction is enhanced. The location of magnets 302 (i.e., remote from field shell 30) and resulting magnetic circuit also reduces flux travel between brake plate 304 and field shell 30 thereby enabling easier release of armature 306 from the brake plate 304 during clutch engagement.

Figure 12:
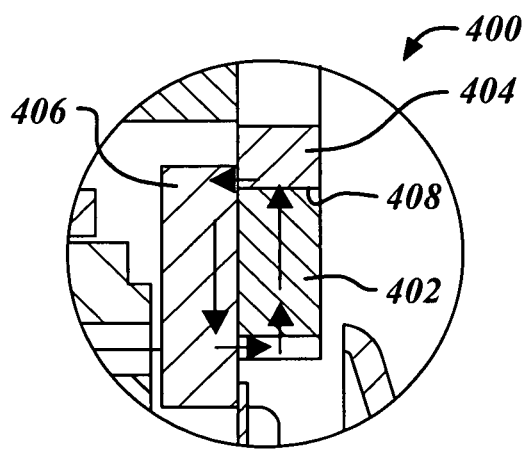
FIG. 12 is an enlarged cross-sectional view of a portion of a rotational coupling device in accordance with another embodiment of the present invention.

Referring now to FIG. 12 a device 400 in accordance with another embodiment of the present invention is illustrated. Device 400 is substantially similar to devices 20, 200, 300 and reference may be had to the description above for like components. Device 400 differs from devices 20, 200, 300 in that magnets 402 are oriented in a different manner within brake plate 404 or armature 406. In the illustrated embodiment magnets 402 are again disposed within brake plate 404. It should again be understood, however, that magnets 402 could alternatively be disposed within armature 406 as described hereinabove with reference to FIGS. 8-9. Magnets 402 are oriented with opposite poles radially spaced from one another. Magnets 402 may again be embedded within through bores 408 in brake plate 404 (or armature 406) and may be arranged such that one face of the magnet 402 is flush with one side (and the engagement surface) of brake plate 404 (or armature 406). By placing the magnets 402 such that one face is flush with the engagement surface of brake plate 404 (or armature 406), magnets 402 add to the wear surface of brake plate 404 (or armature 406) increasing its wear resistance and the braking surface. As in devices 20, 200, and 300, magnets 402 may be arcuately spaced from one another about the circumferential extent of brake plate 404 or armature 406 in a manner similar to that described hereinabove with reference to devices 20, 200 and 300.

In accordance with the present invention, magnets 402 are again axially aligned with a portion of armature 406 (or brake plate 404). Magnets 402 are oriented such that magnetic flux travels radially through magnets 402. In particular, magnetic flux travels from one pole of each magnet 402 (located at one radial end of magnet 402) into brake plate 404 (or armature 406). Flux then travels to armature 406 (or brake plate 404) across the air gap between brake plate 404 and armature 406. Flux continues radially through armature 406 (or brake plate 404) and returns to brake plate 404 (or armature 406) across the same air gap before returning to the opposite pole of magnet 402 (located at the other radial end of magnet 402) from brake plate 404 (or armature 406). The magnetic circuit formed by the inventive device 400 is again more efficient than in conventional devices (although less so than the magnetic circuit in devices 20, 200). In particular, the location of magnets 402 reduces the number of air gaps within the magnetic circuit formed by the brake plate 404, magnet 402, and armature 406 thereby improving the efficiency of the magnetic circuit. In particular, magnetic flux again crosses only four air gaps: (i) from magnet 402 to brake plate 404 (or armature 406); (ii) from brake plate 404 to armature 406 (or from armature 406 to brake plate 404); (iii) from armature 406 to brake plate 404 (or from brake plate 404 to armature 406); and (iv) from brake plate 404 (or armature 406) back into magnet 402. Further, because two of the air gaps involve the armature 406 and the braking surface formed by brake plate 404, magnetic attraction is enhanced. The location of magnets 402 (i.e., remote from field shell 30) and resulting magnetic circuit also reduces flux travel between brake plate 404 and field shell 30 thereby enabling easier release of armature 406 from the brake plate 404 during clutch engagement.

While the invention has been shown and described with reference to one or more particular embodiments thereof, it will be understood by those of skill in the art that various changes and modifications can be made without departing from the spirit and scope of the invention.

I claim:

1. A rotational coupling device, comprising:
   a rotor coupled to an input shaft for rotation therewith, said input shaft disposed about a rotational axis;
   a field shell disposed about said input shaft and fixed against rotation;
   an electrical conductor disposed within said field shell on a first side of said rotor;
   a brake plate coupled to said field shell;
   an armature disposed axially between said rotor and said brake plate on a second side of said rotor opposite said conductor, said armature coupled to an output member; and,
   a first permanent magnet coupled to one of said brake plate and said armature and axially aligned with a first portion of the other of said brake plate and said armature
   wherein a surface of said first permanent magnet engages a surface of said other of said brake plate and said armature when said brake plate and said armature are in engagement.

2. The rotational coupling device of claim 1, further comprising a nonmagnetic spacer disposed between said field shell and said brake plate.

3. The rotational coupling device of claim 1, further comprising a nonmagnetic fastener coupling said brake plate to said field shell.

4. The rotational coupling device of claim 1 wherein said first permanent magnet is oriented such that magnetic flux travels axially through said first permanent magnet.

5. The rotational coupling device of claim 1 wherein said first permanent magnet is oriented such that magnetic flux travels arcuately through said first permanent magnet, said magnetic flux exiting said first permanent magnet at a first surface and reentering said first permanent magnet at a second surface arcuately spaced from said first surface.

6. The rotational coupling device of claim 1 wherein said first permanent magnet is oriented such that magnetic flux travels radially through said first permanent magnet, said magnetic flux exiting said first permanent magnet at one of a radially inner surface and a radially outer surface of said first permanent magnet and reentering said first permanent magnet at another of said radially inner surface and said radially outer surface of said first permanent magnet.

7. The rotational coupling device of claim 1 wherein said first permanent magnet is embedded within a bore formed in said one of said brake plate and said armature.

8. The rotational coupling device of claim 7 wherein a face of said first permanent magnet is flush with one side of said one of said brake plate and said armature.

9. The rotational coupling device of claim 7 wherein said bore is closed at one end.

10. The rotational coupling device of claim 7 wherein said bore extends through said one of said brake plate and said armature.

11. The rotational coupling device of claim 1, wherein said field shell defines axially extending, radially spaced inner and outer poles between which said electrical conductor is received and said rotor defines axially extending, radially spaced inner and outer poles, said inner pole of said rotor disposed radially outwardly of said inner pole of said field shell.

12. The rotational coupling device of claim 1 wherein said field shell defines axially extending, radially spaced inner and outer poles and further comprising a shell in which said conductor is disposed, said conductor and said shell disposed within said field shell between said inner and outer poles, said shell including a radially outwardly extending flange disposed proximate said outer pole of said field shell and said flange affixed to said field shell at a plurality of points.

13. The rotational coupling device of claim 1 wherein said first permanent magnet has an angular distance spanning only a portion of a circumference of said armature.

14. The rotational coupling device of claim 1 wherein said brake plate has an angular distance spanning only a portion of a circumference of said armature.

15. The rotational coupling device of claim 1 wherein said brake plate is suspended from said field shell.

16. A rotational coupling device, comprising:
a rotor coupled to an input shaft for rotation therewith, said input shaft disposed about a rotational axis;
a field shell disposed about said input shaft and fixed against rotation;
an electrical conductor disposed within said field shell on a first side of said rotor;
a brake plate coupled to said field shell;
an armature disposed axially between said rotor and said brake plate on a second side of said rotor opposite said conductor, said armature coupled to an output member; and,
a first permanent magnet coupled to one of said brake plate and said armature and axially aligned with a first portion of the other of said brake plate and said armature further comprising a bearing disposed about said input shaft and supporting said field shell wherein energization of said conductor causes magnetic flux to travel radially inwardly of said bearing along a first path from said rotor to said field shell.

17. The rotational coupling device of claim 16 wherein magnetic flux also travels radially outwardly of said bearing along a second path from said rotor to said field shell.

18. A rotational coupling device, comprising:
a rotor coupled to an input shaft for rotation therewith, said input shaft disposed about a rotational axis;
a field shell disposed about said input shaft and fixed against rotation;
an electrical conductor disposed within said field shell on a first side of said rotor;
a brake plate coupled to said field shell;
an armature disposed axially between said rotor and said brake plate on a second side of said rotor opposite said conductor, said armature coupled to an output member; and,
a first permanent magnet coupled to one of said brake plate and said armature and axially aligned with a first portion of the other of said brake plate and said armature further comprising a second permanent magnet coupled to said one of said brake plate and said armature and axially aligned with a second portion of said other of said brake plate and said armature.

19. The rotational coupling device of claim 18 wherein said second permanent magnet is arcuately spaced from said first permanent magnet.

20. The rotational coupling device of claim 18 wherein each of said first and second permanent magnets is oriented with opposite poles arcuately spaced from one another and a first pole of said first permanent magnet faces a first pole of said second permanent magnet, said first poles of said first and second permanent magnets having the same polarity.

21. The rotational coupling device of claim 18 wherein each of said first and second permanent magnets is oriented with opposite poles arcuately spaced from one another and a first pole of said first permanent magnet faces a first pole of said second permanent magnet, said first poles of said first and second permanent magnets having the opposite polarity.

22. The rotational coupling device of claim 18 wherein said one of said brake plate and said armature defines a slot between said first and second permanent magnets.

23. The rotational coupling device of claim 18 wherein said one of said brake plate and said armature includes first, second and third radially extending, arcuately spaced tabs, said first and second tabs separated from one another by a first radially extending slot and said second and third tabs separated from one another by a second radially extending slot, said first and second permanent magnets located at said first and third tabs.

* * * * *